(12) United States Patent
Loeb

(10) Patent No.: US 8,463,728 B2
(45) Date of Patent: Jun. 11, 2013

(54) SYSTEM AND METHOD FOR A REACTIVE AND PERSONALIZED EXPOSURE OF MOBILE END-USER CONTEXT TO A THIRD PARTY

(75) Inventor: Shoshana K. Loeb, Philadelphia, PA (US)

(73) Assignee: Telcordia Technologies, Inc., Piscataway, NJ (US)

(*) Notice: Subject to any disclaimer, the term of this patent is extended or adjusted under 35 U.S.C. 154(b) by 931 days.

(21) Appl. No.: 12/508,638

(22) Filed: Jul. 24, 2009

(65) Prior Publication Data

US 2010/0023472 A1 Jan. 28, 2010

Related U.S. Application Data

(60) Provisional application No. 61/083,285, filed on Jul. 24, 2008.

(51) Int. Cl.
  *G06F 17/00* (2006.01)
  *G06N 5/02* (2006.01)
(52) U.S. Cl.
  USPC .......................................................... 706/47
(58) Field of Classification Search
  None
  See application file for complete search history.

(56) References Cited

U.S. PATENT DOCUMENTS

| 7,043,489 B1* | 5/2006 | Kelley .................................. 1/1 |
| 2004/0133638 A1 | 7/2004 | Doss et al. |
| 2004/0253963 A1* | 12/2004 | Park et al. .................. 455/456.2 |
| 2006/0050686 A1* | 3/2006 | Velez-Rivera et al. ........ 370/352 |
| 2006/0168073 A1 | 7/2006 | Kogan et al. |

OTHER PUBLICATIONS

International Search Report dated Sep. 15, 2009.

* cited by examiner

*Primary Examiner* — Li-Wu Chang
(74) *Attorney, Agent, or Firm* — Philip J. Feig

(57) ABSTRACT

A system and method for a reactive and personalized exposure of user context to a third party comprises information sources, a context discovery module providing the user context based on the information sources, an identification module obtaining an identity of the third party, a personalization engine, and a rendering system rendering and forwarding a reply to the third party, wherein if the identification module obtains the identity, the personalization engine creates a personalized message in accordance with the user context and the identity and the reply is the personalized message, and if the identification module does not find the identity, the reply is a generic message. The context discovery module and the identification module can each comprise an inferencing engine. The inferencing engine can be associated with a policy engine. Policy engines can be associated with each module and/or engine. The personalization engine can comprise a database of special messages.

14 Claims, 3 Drawing Sheets

SYSTEM AND METHOD FOR A REACTIVE AND PERSONALIZED EXPOSURE OF MOBILE END-USER CONTEXT TO A THIRD PARTY

CROSS REFERENCE TO RELATED APPLICATIONS

The present invention claims the benefit of U.S. provisional patent application 61/083,285 filed Jul. 24, 2008, the entire contents and disclosure of which are incorporated herein by reference as if fully set forth herein.

FIELD OF THE INVENTION

The present invention relates generally to mobile end-user context received from and provided to a third party.

BACKGROUND OF THE INVENTION

There is a profound shift in the way people communicate in "always on" or "always connected" environments where the expectation is that emails and instant messages, as well as the traditional voice call, reach the recipient virtually instantly and are perhaps responded to instantly. Additionally, with the strong market penetration of social networking applications, the sense and expectation that others are visible and accessible at all times becomes pervasive. In such environments, the need arises for an increased level of transparency in communication when appropriate. Given this expectation, the need arises for users to have the flexibility to dynamically tailor the automatic response that their communication devices provide to the context that they are in and to the level of privacy they want to protect.

Today technologies such answering machines and automatic email responses give a caller or email sender some general sense of the whereabouts of the machine's user. In the case of an unanswered phone call, an answering machine can let the caller know that the user is away from the phone or on another call. In addition, the machine can, if the user is away for a prolonged period of time, let the caller know when to expect the user back, and, if desired, an alternative means of reaching him, such as a cell phone number. The answering machine provides a way to store a short message containing any information provided by the user and this information will reach anyone that calls, indiscriminately. In the case of an automatic email response, the situation is similar.

SUMMARY OF THE INVENTION

A method and a system that allow a user to dynamically tailor an automatic response to an attempt to contact him, and to control how much of his current context is revealed to the person attempting to contact him, is presented. The inventive system and method reacts to a received communication in a fashion that is personalized to the person sending the communication and contains selective context (including location and calendar information) and time sensitive information. Dynamically personalized responses as well as appropriate context information are automatically provided to the contacting party.

The inventive system and method for a reactive and personalized exposure of user context to a third party comprises information sources, a context discovery module providing the user context based on the information sources, an identification module obtaining an identity of the third party, a personalization engine, and a rendering system rendering and forwarding a reply to the third party, wherein if the identification module obtains the identity, the personalization engine creates a personalized message in accordance with the user context and the identity and the reply forwarded to the third party is the personalized message, and if the identification module does not find the identity of the third party, the reply is a generic message. The context discovery module and the identification module can each have an inferencing engine. Each inferencing engine can be associated with a policy engine. Policy engines can be associated with each module and/or engine. The personalization engine can have a database of special messages. The inventive method is initiated by the third party. The identity of the third party can comprise a name, a priority, and a category. The personalized message can comprise user whereabouts, when user will be available, and a specialized message.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

Figure 1:
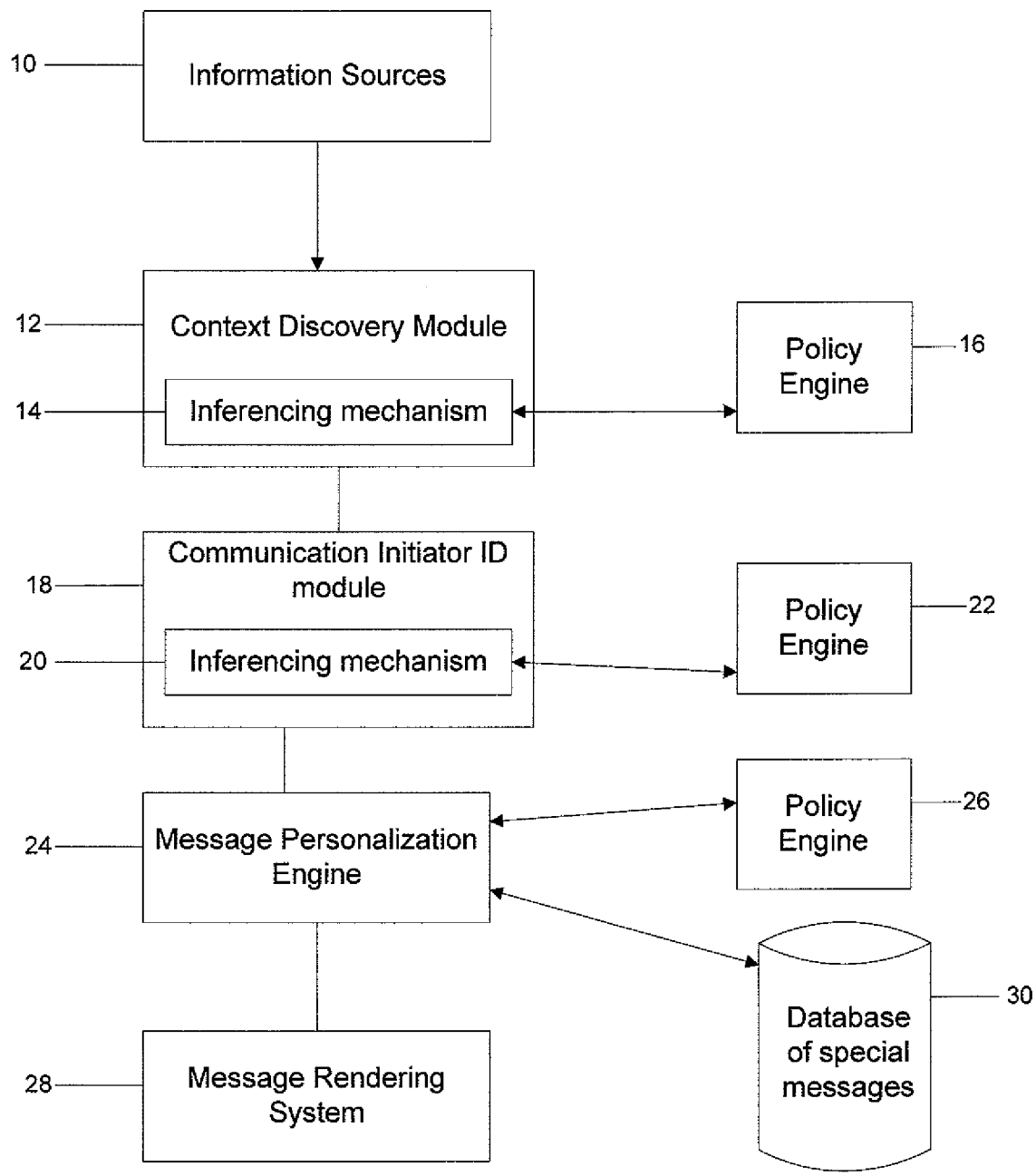
FIG. 1 is a schematic diagram of the inventive system.

The inventive system and method reacts to a received communication with a response that is personalized to the person sending the communication and contains selective context (including location and calendar information) and time sensitive information. The initial communication that the user may receive can include a phone call (wireless, wireline, over the internet), an email, a sms, instant message, and/or twitter message. The invention automatically identifies or classifies, e.g., categorizes, the person attempting to communicate with the user, e.g., the communication initiator, and then creates a customized response based on that categorization in accordance with predefined policies. The category, e.g., spouse, child, parent, employer, supervisor, co-worker, business associate, etc., in conjunction with the policies associated with the classification or category, provides a way to automatically control the amount of information the user reveals about his present context, and hence protects his privacy, while at the same time ensures that people who need to know get the appropriate information about the user's whereabouts and plans.

Users of the inventive system can have various levels of context, such as a level of "I cannot get to the phone right now" or "I am at the dentist right now", as well as another level of "I will be in the office at 10 am today" or "I am driving for the next two hours". An additional level can be available, such as who the caller can call for assistance or a pre-recorded message that is meant only for this particular caller. More and/or different levels can also exist.

For example, if a supervisor sends the user an email while the user is driving to the office in the morning, and the user receives the email on his Blackberry and reads it but cannot respond, he can allow the inventive system to send an automatic response to the supervisor indicating that the email was read and that the user is on his way to the office, with estimated arrival time of 30 minutes. In another example, if the user receives an email from a co-worker but does not read it, no response will be generated.

In yet another example, if the user's mother calls while the user is in a meeting, the user can enable the system to supply a voice message to tell her mother, perhaps even in Hebrew, that the user is in a meeting. The user could include information indicating what the meeting is about and with whom, so that her mother does not get offended that the user does not answer her mother's call.

In still another example, if the user gets a call from a business associate, the user may want a generic message such as one asking that the associate send the user an email. However, if the user knows why the associate is calling, the user may specify in advance what to tell the associate, such as what time the user will be in the office, etc.

The user of the service can access and/or operate the service on any communication device on which he is contacted; the system is not specific to one of his or her phones or laptops. The system may reside on a user's computer, on his mobile phone or anywhere else in the cloud, in the phone network, e.g., at the Service Control Point (SCP), or in any third party server or any combination of these locations. The system can be delivered over the internet or over the phone network or using any other available communications network.

FIG. 1 is a schematic diagram of the inventive system. As shown in FIG. 1, the system comprises information sources 10 to determine current context of the message/call receiver or system user. Determining the current context of the user entails looking at one or all of the following information sources: the user calendar, to-do list, current location information as provided by a GPS service or other services, social network information, and/or time of day. Other sources may also be used, if appropriate. If the user is driving, a navigation system or GPS service, for example, can provide information related to the user speed and when he is expected to reach his destination. The information sources 10 may reside on the user's computer and various social networks, on his mobile phone, or any cloud or third party server, or any combination of these devices and/or locations, and can be accessed via the internet, the phone network or any other communication network available.

The system also comprises a context discovery module 12. The information sources 10 may provide both generic information about the user context, e.g. is geo coordinated, or more semantically rich information, e.g., "he is at home". If the information does not carry sufficient semantic meaning, the context discovery module 12 can add as much of the missing information as it can infer. For example, in the case of locations, the context discovery module 12 can label places as: "home", "office", "car", "train", "coffee shop", "park", "conference room", etc. One embodiment focuses mostly on the mobile scenario which offers a rich context. The various contexts are organized in context hierarchies as described below.

Given the information provided by the one or more information sources 10, the context discovery module 12 can infer, using an inferencing mechanism 14, the whereabouts of the user, that is, whether the user is in the car driving, in the office, at home, in a meeting, at a doctor's office, etc. The inferencing mechanism 14 has its own associated policy engine 16 with rules and/or policies associated with the inferences, e.g., context information, to be determined. This inferencing mechanism 14 can derive the context information in a variety of ways including the following.

One way is from the user profile that was originally specified by the user as part of the initial registration to the service where he completed a form with his home address, place of work and perhaps other addresses he frequents such as the dentist, doctor, child's school, etc.

Another way the context discovery module 12 can derive the information is using the user calendar and/or to do list and correlating data from these lists with the user's whereabouts, from a GPS for example, so that if the calendar specifies a dentist appointment at 9 am, the context discovery module 12 can use the inferencing module 14 to infer that the GPS coordinates of the user at that time are associated with that particular appointment.

Yet another way the module 12 can infer is by applying machine learning techniques to look at the pattern of behavior of the user and assess and correlate his most frequent places of visit. Alternatively, instead of using the inferencing mechanism 14, the user of the system can explicitly inform the system of his or her whereabouts, enabling more accuracy in the automatically generated response.

The system also comprises a sender/caller or communication initiator identification module 18. This module also includes an inferencing mechanism 20 having various inferencing capabilities based on information about the user, the communication initiator, the nature of their relationship, the history of the relationship, user calendar information, user location and various task oriented information such as to-do lists. The inferencing mechanism 20 has its own associated policy engine 22 with rules and/or policies associated with the inferences, e.g., communication initiator identification, to be determined.

The caller ID, email, and other caller identifications are used by the identification module 18 to look up any information available to the system about the caller. This information can include: a personal contact list with additional attributes to signify or categorize the caller such as "important customer", "my mother", "my boss", etc., and social networking type information that can be automatically gathered and stored about people on demand. For example, if the user specifies on twitter and/or face book that he is boarding a plane, the system can obtain this information and inform a communication initiator of this information, provided that he or she is allowed access to this level of information, as discussed below. Policies associated with each communication initiator can include what permission or level of private information each is entitled to receive. As discussed below, each piece of context information has a privacy level associated with it and only people that are permitted to obtain information at a given level will receive the piece of information having that level.

Examples of inferencing capabilities, that is, guessing who the caller is based on available information, of the communication initiator module 18 using its inferencing mechanism 20 along with the policy engine 22 include the following. In the case of a phone call, when the caller ID indicates that the call is from a company without showing the actual identity of the caller (which is often the case when dialing from an office phone in a large company), the module inference engine 20 can check the calendar to see if a call from an individual from that company is expected and then identify him/her. If a call is expected from that company, e.g., an insurance company, without reference to an individual, it will be identified as such, otherwise if there is no entry on the calendar, the user contact list can be consulted to see if he knows anyone from that company, and if so, the module can check if the user communicated with this individual recently to assess the probability that it is this individual who is calling.

If the caller ID is "unknown", this may be an international call. If the user has family or contacts abroad, an inference is made that it may be one of them calling. If the caller ID is "Private" then the call is treated as unsolicited.

In the case of an email, the email address may or may not indicate a name. If the name is shown and is in the user contact list, the email sender is identified as a known contact. If the name is not in the contact list and is not expected, as indicated by the to-do list or correspondence within the last few days, the communication is identified as "unsolicited".

The system also comprises a message personalization engine 24. The structure of the message to be exposed to the caller/sender has three parts as described below. Various policies and/or rules, residing in a policy or rules engine 26, can be used by the system to react to each type of communication. The policies relevant to the personalized messages are executed by the policy engine or rules engine 26 that is part of the message personalization engine 24.

These policies and/or rules can be established by the user through a menu on a website or the phone when the system is initiated and can be modified any time after that.

Using the policies that are executed by the policy engine or rules engine 26, the system picks the relevant usage of detail that reveals only that part of the context information that the user wants to reveal, given the information collected about the caller by the communication initiation module 18 and the context by the context discovery module 12.

The system also comprises a message rendering system 28 that includes creating a personalized message as discussed below. Based on the user's preference and mode of communication, e.g., email, telephone, etc., the message rendering system 28 will play or display the personalized message including speak synthesis, personalized recording, multiple languages, etc.

The personalized messages are constructed in real time, that is, dynamically constructed by the message rendering system 28, and these personalized messages can have one or more of three optional parts as follows. The first part can be user whereabouts at various levels of granularity, including when he can see/hear the message. The second part can reveal when the user will be available, based on current and future context. The third part can be a specialized message in accordance with the context and the caller. Each part is discussed further below.

The user whereabouts part can be based on time of day, location, and/or on calendar appointment. In one embodiment, the default is: "the user is not available to respond right now". For users that have permission, that is, the appropriate privacy level, the personalized message can be more detailed. It could say "the user is in a meeting with his boss right now". The level of exposure is determined by the caller relationship to the user, e.g., caller category, the context hierarchy, described below, and the policies with respect to the policy or rules engine 26.

In this part of the personalized message, the user can also allow the caller/sender or communication initiator to know when his original message will be seen/heard. For example, in the case of receiving/reading email during a meeting, the response may indicate that the user read the email but he cannot respond at this time and will respond at a later time. Further, if the sender is entitled to know, that is, has permission, the personalized message may, for example, specify that the user will be done with his meeting in an hour and will respond then. As part of the second part of the message, discussed below, the specific time may be determined by a policy.

The second part of the message, when the user will be available, can be as follows. Based on the user calendar and other context information available from the context discovery module 12, the system can expose the information about when the user will be available. Whether or not this information is revealed in the message depends on the policies associated with the user. Information, such estimated time of arrival at a destination from which a response can be made, can be obtained by the system from personal navigation systems or can be computed if the system has location, speed and route information available. In cases where the system cannot estimate when the user will be available, or when the caller/sender does not have permission to know this information, a generic message can be provided saying that the user is not available and will reply as soon as possible.

A third part of the personalized message can be a specialized message or portion. This part can be indexed under the caller/sender name or under the type or category of caller/sender, e.g., customer, colleague, close family, etc.

In order to support a wide range of policies for the personalization of the message, the inventive system organizes the user context in a context hierarchy that captures its various privacy attributes ranging from very private to public. This context hierarchy enables the user to specify a range of contexts with attributes such as private, semi-private and public, or to provide a numeric scale for how private a context attribute is or to otherwise rank various context attributes. For example, being away on business can be labeled as "1" or public and may be disclosed, via a policy, to anyone calling and/or emailing, while going to the doctor can be labeled as "5" or private, and could only be disclosed, via a policy, to a small group of people.

In order to enable the message personalization engine 24 to create a message with the appropriate level of detail for the specific caller/sender, policies need to be applied to which information can be exposed to that specific caller/sender. If no specific policy is available, that is, if this specific caller/sender is not known to the user or is not sufficiently known to have specific policies associated with his name, then a default, generally public policy can be applied. The policies can be applied to a particular caller/sender, e.g., "my boss", such as: "If the caller/sender is my boss do not specify my location but only specify when I will be able to call him back and when I am expected back in the office".

The policies can also be applied regarding a specific caller category or type, e.g., "a customer", such as "If a customer calls, tell him when I will be in the office and also ask him to leave a message on my office phone".

In addition, the policies can specify how to handle a specific context, such as "Do not let anyone know I am at the Doctor's office. Say I am unavailable". The policies can also specify time of day or day of the week or seasonal, such as "if anyone contacts me between 2-4 pm, say I will be available at 4:30", or "Say "Merry Christmas" at the end of the message if the current date is between December $20^{th}$ and $25^{th}$".

Since the message may have three optional parts, each part of the message has its own associated policies, namely, as discussed above, there are policies that specify how much of the context to reveal to the caller/sender in the "whereabouts" part, whether to tell the caller/sender when the user is available or when he will call back in the second part of the message, and whether to add a pre-specified portion in the third part of the message.

These personalized messages can access a database of specialized messages 30. At times, the user may want to specify messages to be delivered to a particular caller/sender or caller/sender type. This can be done using predefined messages associated with the caller/senders. Accordingly, the database of special messages 30 stores complete messages that the user pre-records by himself to be played to specific people or groups or categories of people. For example, the user can leave a message for person X that will be played in its entirety to X when he calls. These messages can also be addressed to group; for example the user can pre-record a message that will be played only to member of his family if he or she calls, or to people from his office, etc.

For example, a special message can be associated with communication initiator John Smith as "If John Smith calls today before 11 am tell him 'I am out of town until Tuesday'". Similarly, a special message can be pre-recorded and implemented as "If any colleague emails me in the next 3 days, say "I am out of town on business", and if anyone else emails me during this period do not respond. The special messages are stored in the database 30 and are indexed by the time of day that they are active and by the called/sender name and/or type that they are associated with.

FIG. 1 shows an embodiment in which the context discovery module 12 and the communication initiator ID module 18 each have their own inferencing mechanism, 14, 20, respectively, which can be implemented as different instances of the software. In other embodiments, each module in the system can have its own inferencing mechanism, implemented as either the same software with different inputs or as different instances of the same software. Similarly, each inference engine function 14, 20 is shown in FIG. 1 as having its own associated policy engine 16, 22, respectively, that is, rules and/or policies that address the two domains/modules, that is, the communication initiator ID module 18 and the context discovery module 12, and the message personalization engine 24 also has its own policy engine 26. In other embodiments, a policy engine 16, 22, 26 implemented as either the same software with different inputs or as different instances of the same software can be used.

Figure 2:
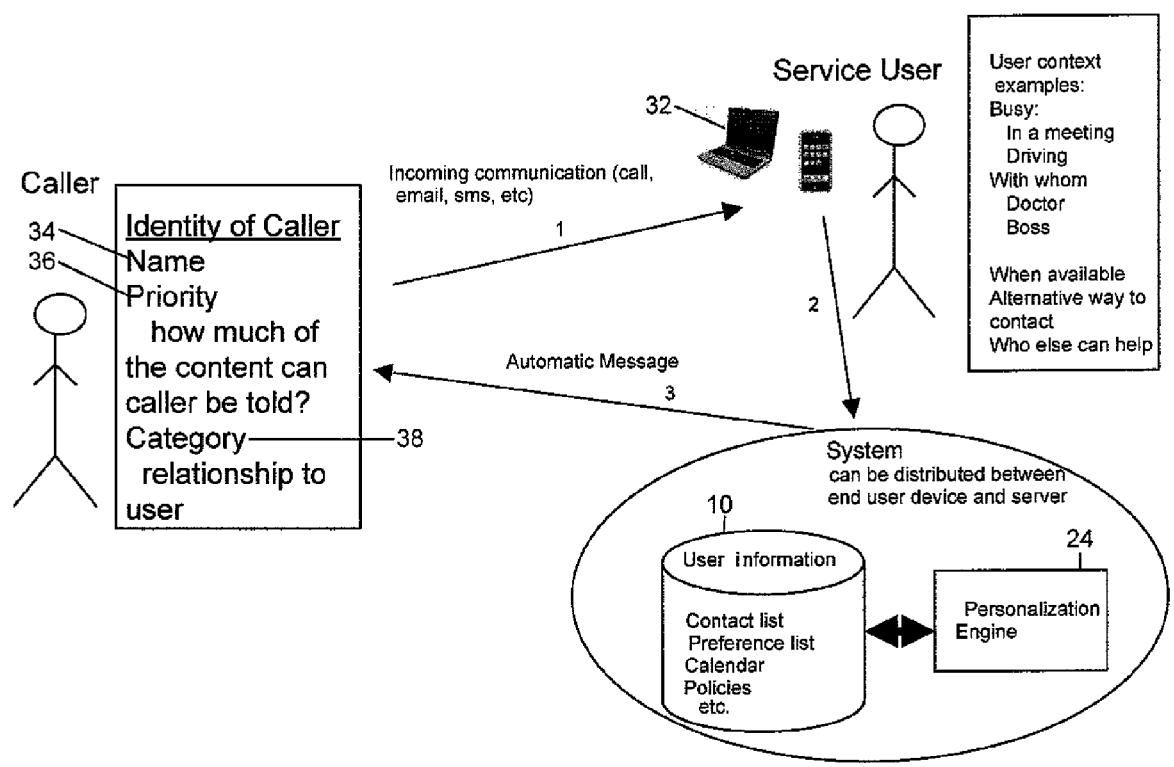
FIG. 2 is an overview of an embodiment of the inventive system.

FIG. 2 is an overview of the inventive system, including a caller or communication initiator, a service user or user and some elements of the inventive system. Arrow 1 of FIG. 2 shows that the caller initiates contact, creating an incoming communication, such as a telephone call, an email, an sms, etc., to an end user device 32 such as laptop computer, cell phone, or other device. Arrow 2 shows that the contact is relayed to the inventive system which can be distributed between the end user device 32 and a server (not shown). Arrow 3 shows that an automatic message is sent from the system to the caller or communication initiator. The Identity of the Caller can include a name 34, a priority 36, and a category 38 for the caller.

Figure 3:
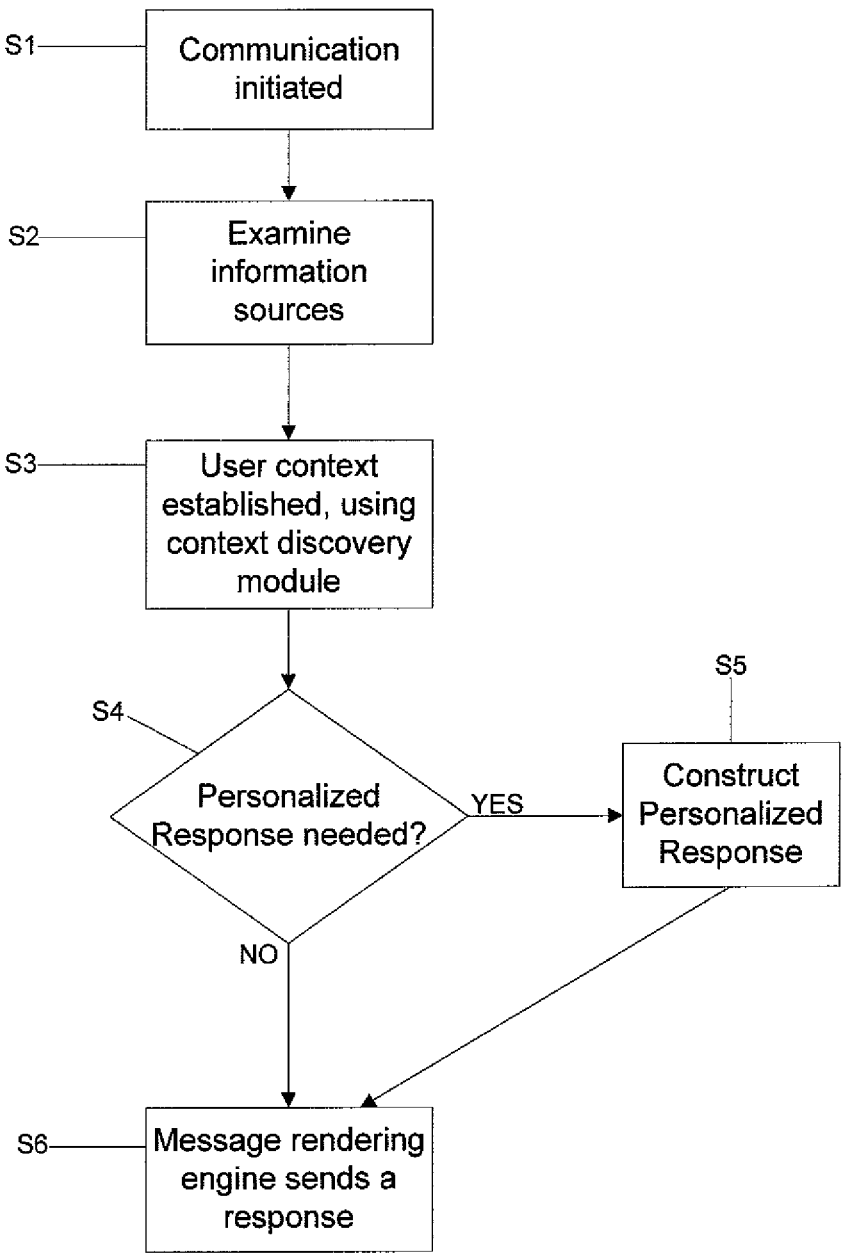
FIG. 3 is flow diagram of the inventive method.

Operation of the inventive system is shown in accordance with the flow diagram of FIG. 3. In step S1, a communication initiator, such as a caller and/or a sender of a message, contacts the user via email, phone call (wireless or wireline, internet or telephony), sms, twitter, etc. The call/message could be reaching the user's computer, his cell phone or any other communications device.

In step S2, the system examines various information sources 10 to find out the relevant caller/sender identity and attributes. As discussed above, the identity and attributes are determined in accordance with the caller id, if available, the email address, the contact list, etc. Note that the contact list may have information at various levels of detail depending on the relationship of the caller/sender with the user. The information obtained from the information sources 10 may also include instructions on how to treat the person initiating the communication (e.g., if is my mother, answer in Hebrew).

In step S3, the user context can be established by the context discovery module 12. This step can occur after step S2, or possibly in parallel with it, or sometimes in advance of step S2, such as when the user context is needed for other applications and may be readily available to the context discovery module 12. Note that the underlying platform on which this system is running may be keeping track of portions of the user context continuously for other reasons, e.g., other applications that it supports such as a personalized navigation application. If the user context is partially or fully available from the platform, then the inventive system will use this user context and may need to augment it with additional specialized information, for example, was the user expecting a communication from the communication initiator.

Step S4 determines a need for a personalized response. If the communication was anticipated and there are instructions on how to handle it which are stored under the caller/sender name or under the type associated with this caller (S4=YES), a personalized message is constructed in step S5, using the personalized message engine 24 that employs the user and the context attributes from the context discovery module 12 and applies the appropriate policies as well as checks for any special messages that are needed. As indicated above, the personalized message is composed of three parts, each of which is constructed using the appropriate policies.

When the user/sender is completely unknown (S4=NO), a generic message saying "please leave a message" will be applied to a voice call and no response will be given to an email or sms. After construction, the message is sent to the message rendering engine 28 in step S5.

The message rendering engine 28 sends a response to the communication initiator in the appropriate modality and format (email, sms, voice) in step S6.

One example, or use case, of the inventive system is when an important call is anticipated while the user is driving and on a conference call. In this scenario, the user is engaged in an important call while driving to his office, and his boss calls. Given the pre-define policies associated with the three message parts as they relate to the boss, the system composes a message telling the boss that the user is driving to the office, is on a call with person X and is estimated to arrive at the office in an hour. If the user pre-specified a special message for his boss, it will be included as well. To provide the ability for rich personalization, the inventive system and method consults with the user's pre-set preferences as well as checks to see if there is any specialized message that the user recorded in advance. This scenario illustrates the increase in effectiveness of the system to handle calls while the user is busy, and the ability to personalize how much of the user context is revealed to the caller and to play a pre-recorded message if needed.

A second example of the inventive system is the scenario in which a user is at a doctor's office and receives a call. In this scenario, the user is at the doctor's office and a colleague calls. The user would like the colleague to know only that he will be in the office at noon but does not want to reveal the user's full context, that is, being at a doctor's office. In this case, the system knows the full context and has a policy that says not to reveal any healthcare related information or any information labeled as private to colleagues at work unless specified otherwise for the particular individuals. So using the context hierarchy, the system reveals the less private level of information which entails replying that the user is not available right now and when he will be available. On the other hand, if the user's mother calls, the user would like to reveal the full context and also mention that he will call her back when he is free.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for a reactive and personalized exposure of user context to a third party, comprising:
    a processor
    one or more information sources;
    a context discovery module comprising at least an inferencing engine providing the user context based on one or more of said one or more information sources, and organizing user context in a context hierarchy according to a privacy level;
    an identification module connected with at least a policy engine obtaining the identity of the third party, said policy engine comprises the level of privacy associated with each piece of user context information;
    a personalization engine creating a personalized message in accordance with the user context and the identity of the third party; and
    a rendering system rendering and forwarding a reply to the third party, wherein the reply includes one of the personalized message, comprising a part of the user context, and a generic message.

2. The system according to claim 1, said identification module comprising at least an inferencing engine.

3. The system according to claim 2, wherein said inferencing engine is associated with a policy engine.

4. The system according to claim 1, said context discovery module, said identification module, and said personalization engine each associated with a policy engine.

5. The system according to claim 1, said personalization engine comprising at least a database of special messages.

6. The system according to claim 1, said identity of the third party comprising a name, a priority, and a category.

7. The system according to claim 1, said personalized message comprising user whereabouts, when user will be available, and a specialized message.

8. A system for a reactive and personalized exposure of user context to a third party, comprising:
    a processor
    one or more information sources;
    a context discovery module comprising at least an inferencing engine providing the user context based on one or more of said one or more information sources, and organizing user context in a context hierarchy according to a privacy level associated with each piece of user context information;
    an identification module connected to at least a policy engine searching for an identity of the third party, said policy engine comprises the level of privacy associated with each piece of user context information;
    a personalization engine; and
    a rendering system rendering and forwarding a reply to the third party, wherein if the identification module finds the identity, the personalization engine creates a personalized message in accordance with the user context and the identity of the third party and the reply is the personalized message, and if the identification module does not find the identity, the reply is a generic message.

9. A method for a reactive and personalized exposure of user context to a third party, comprising:
    initiating contact by the third party;
    obtaining the user context based on one or more information sources, said obtaining the user context comprising inferring using an inferencing engine and organizing user context in a context hierarchy according to a privacy level;
    searching for an identity of the third party, and if searching finds the identify, creating a personalized message in accordance with the user context and the identity of the third party said searching comprising inferring using an inference engine connected with a policy engine comprises the level of privacy associated with each piece of user context information; and
    rendering and forwarding a reply to the third party, wherein if searching finds the identity, the reply is the personalized message, and if searching does not find the identity, the reply is a generic message.

10. The method according to claim 9, said steps of obtaining searching and rendering each using a policy engine.

11. The method according to claim 9, said step of rendering using at least a database of special messages.

12. The method according to claim 9, wherein said identity of the third party comprises a name, a priority, and a category.

13. The method according to claim 9, wherein said personalized message comprises user whereabouts, when user will be available, and a specialized message.

14. A non-transitory computer readable storage device having computer readable program for operating on a computer for a reactive and personalized exposure of user context to a third party, comprising:
    initiating contact by the third party;
    obtaining the user context based on one or more information sources, said obtaining the user context comprising inferring using an inferencing engine and organizing user context in a context hierarchy according to a privacy level;

searching for an identity of the third party, and if searching finds the identify, creating a personalized message in accordance with the user context and the identity of the third party said searching comprising inferring using an inference engine connected with a policy engine comprises the level of privacy associated with each piece of user context information; and rendering and forwarding a reply to the third party, wherein if searching finds the identity, the reply is the personalized message, and if searching does not find the identity, the reply is a generic message.

\* \* \* \* \*

UNITED STATES PATENT AND TRADEMARK OFFICE
CERTIFICATE OF CORRECTION

PATENT NO. : 8,463,728 B2  
APPLICATION NO. : 12/508638  
DATED : June 11, 2013  
INVENTOR(S) : Loeb Page 1 of 1

It is certified that error appears in the above-identified patent and that said Letters Patent is hereby corrected as shown below:

In the Specification

In Column 2, Line 30, delete "FIG. 3 is flow" and insert -- FIG. 3 is a flow --, therefor.

In Column 5, Line 48, delete "night" and insert -- right --, therefor.

In the Claims

In Column 9, Line 43, in Claim 1, delete "processor" and insert -- processor; --, therefor.

In Column 10, Line 10, in Claim 8, delete "processor" and insert -- processor; --, therefor.

In Column 10, Line 14, in Claim 8, delete "sources, and" and insert -- sources and --, therefor.

Signed and Sealed this  
Twenty-fifth Day of November, 2014

Michelle K. Lee  
*Deputy Director of the United States Patent and Trademark Office*